(12) United States Patent
Kim

(10) Patent No.: US 6,829,022 B2
(45) Date of Patent: Dec. 7, 2004

(54) CHUCK FOR EXPOSURE APPARATUS

(75) Inventor: Yong Hun Kim, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/327,980

(22) Filed: Dec. 26, 2002

(65) Prior Publication Data

US 2003/0128308 A1 Jul. 10, 2003

(30) Foreign Application Priority Data

Dec. 31, 2001 (KR) ............................ 10-2001-0088755

(51) Int. Cl.⁷ ...................... G02F 1/1333; C23C 16/00; C23C 4/08; B05C 13/00
(52) U.S. Cl. ...................... 349/58; 118/728; 118/500; 427/455
(58) Field of Search ........................ 349/58, 187, 141; 118/728, 500; 427/455, 241, 123, 124, 125; 156/345.51

(56) References Cited

U.S. PATENT DOCUMENTS

| | | | | |
|---|---|---|---|---|
| 4,808,983 A | * | 2/1989 | Benjamin et al. | 345/90 |
| 5,598,285 A | | 1/1997 | Kondo et al. | 349/39 |
| 5,745,207 A | | 4/1998 | Asada et al. | 349/141 |
| 5,838,037 A | | 11/1998 | Masutani et al. | 257/296 |
| 5,919,606 A | * | 7/1999 | Kazlas et al. | 430/321 |
| 5,946,060 A | | 8/1999 | Nishiki et al. | 349/48 |
| 5,990,987 A | | 11/1999 | Tanaka | 349/43 |
| 6,028,653 A | | 2/2000 | Nishida | 349/141 |
| 6,097,454 A | | 8/2000 | Zhang et al. | 349/43 |
| 6,149,365 A | * | 11/2000 | White et al. | 414/217 |
| 6,151,085 A | * | 11/2000 | Tomono et al. | 349/1 |
| 6,371,712 B1 | * | 4/2002 | White et al. | 414/217 |
| 6,451,515 B2 | * | 9/2002 | Takamori et al. | 430/330 |
| 2002/0062787 A1 | * | 5/2002 | Hashizume et al. | 118/664 |
| 2002/0196381 A1 | * | 12/2002 | Taguch | 349/1 |
| 2003/0172874 A1 | * | 9/2003 | Kawaguci | 118/728 |

FOREIGN PATENT DOCUMENTS

| | | |
|---|---|---|
| JP | 09-005764 | 1/1997 |
| JP | 09-073101 | 3/1997 |
| JP | 09-101538 | 4/1997 |
| JP | 09-105908 | 4/1997 |

OTHER PUBLICATIONS

R. Kieler et al.; "In–Plane Switching of Nematic Liquid Crystals"; Japan Display '92; pp. 547–550.

M. Oh–e, et al.; "Principles and Characteristics of Electro–Optical Behaviour with In–Plane Switching Mode"; Asia Display '95; pp. 577–580.

M. Ohta et al.; "Development of Super–TFT–LCDs with In–Plane Switching Display Mode"; Asia Display '95; pp. 707–710.

S. Matsumoto et al.; Display Characteristics of In–Plane Switching (IPS) LCDs and a Wide–Viewing–Angle 14.5–in. OPS TFT–LCD; Euro Display '96; pp. 445–448.

H. Wakemoto et al.; "An Advanced In–Plane Switching Mode TFT–LCD"; SID 97 Digest; pp. 929–932.

S.H. Lee et al.; High–Transmittance, Wide–Viewing–Angle Nematic Liquid Crystal Display Controlled by Fringe–Field Switching; Asia Display '98; pp. 371–374.

S. Endoh et al.; Diagonal Super–TFT–LCDs with Mega Wide Viewing Angle and Fast Response Speed of 20ms; IDW '99; pp. 187–190.

* cited by examiner

Primary Examiner—Robert H. Kim
Assistant Examiner—Mike Qi
(74) Attorney, Agent, or Firm—McKenna Long & Aldridge LLP

(57) ABSTRACT

The present invention is related to a chuck on which an array substrate having a plurality of cells for an IPS-LCD device is located for a light exposure process. The chuck of the present invention includes a chuck frame having a rectangular shape corresponding to a substrate; first and second lift pin holes that face to each other with respect to a horizontal center line of the chuck frame; third and fourth lift pin holes that face to each other with respect to a vertical center line of the chuck frame; and lift pins in each lift pin hole. Therefore, light reflected by the lift pin holes during the light exposure process does not affect a photo-resist formed over the substrate.

12 Claims, 6 Drawing Sheets

CHUCK FOR EXPOSURE APPARATUS

This application claims the benefit of Korean Patent Application No. 2001-0088755, filed on Dec. 31, 2001, which is hereby incorporated by reference for all purposes as if fully set forth herein.

BACKGROUND OF THE INVENTION

1. Field of the Invention

The present invention relates to a chuck for an exposure apparatus that is used in forming a liquid crystal display (LCD) device, especially an in-plane switching mode liquid crystal display (IPS-LCD) device.

2. Description of the Related Art

A liquid crystal display device uses the optical anisotropy and polarization properties of liquid crystal molecules to produce an image. Liquid crystal molecules have a definite alignment direction as a result of their long, thin shapes. That alignment direction can be controlled by an applied electric field. In other words, as an applied electric field changes, so does the alignment of the liquid crystal molecules. Due to the optical anisotropy, the refraction of incident light depends on the alignment direction of the liquid crystal molecules. Thus, by properly controlling an applied electric field a desired image can be produced.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs) and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

FIG. 1 shows a schematic exploded perspective view illustrating an LCD device according to a related art. The LCD device 11 includes an upper substrate 5 and lower substrate 22 that are spaced apart and face each other, and a liquid crystal layer 14 interposed therebetween. The upper substrate 5 and the lower substrate 22 are called a color filter substrate and an array substrate, respectively. On the rear surface of the upper substrate 5, a black matrix 6 and a color filter layer 8, including a plurality of red (R), green (G) and blue (B) color filters, are formed. The black matrix 6 surrounds each color filter forming an array matrix. The upper substrate 5 also includes a common electrode 18 covering the color filter layer 8 and the black matrix 6. The common electrode 18 is preferably made of a transparent conductive material.

On the front surface of the lower substrate 22, thin film transistors (TFTs) T acting as switching elements, are formed in the shape of an array matrix corresponding to the color filter layer 8. In addition, a plurality of gate and data lines 13 and 15 cross each other such that each TFT is positioned near each crossing of the gate and data lines 13 and 15. Each individual pair of gate and pair of data lines 13 and 15 define a pixel region P. In the pixel region P, a pixel electrode 17 is disposed. The pixel electrode 17 is formed of a transparent conductive material, such as indium tin oxide, which has an excellent transmissivity.

The LCD device having the above-mentioned structure displays color images by applying signals through the TFTs T to the pixel electrodes 17. The gate line 13 applies a first signal to a gate electrode of the TFT T, and the data line 15 applies a second signal to a source electrode of the TFT T. Therefore, the LCD device drives the liquid crystal molecules using their electro-optic characteristics.

The liquid crystal layer 14 is a dielectric anisotropic material having spontaneous polarization characteristics. Due to their dipole and spontaneous polarization when electric signals are applied to the pixel electrode 17 and to the common electrode 18, the liquid crystal molecules of the liquid crystal layer 14 are rearranged in accordance with the electric field. As the liquid crystal molecules are rearranged, the optical property of the liquid crystal layer changes, creating an electro-optic modulation effect.

In the LCD device of the related art shown in FIG. 1, since the pixel and common electrodes are positioned on the lower and upper substrates, respectively, the electric field induced between them is perpendicular to the lower and upper substrates. However, the above-described LCD devices having the longitudinal electric field have a drawback in that they have a very narrow viewing angle. In order to solve the problem of narrow viewing angle, in-plane switching liquid crystal display (IPS-LCD) devices have been proposed. The IPS-LCD devices typically include a lower substrate where a plurality of pixel electrodes and common electrodes are disposed, an upper substrate having no electrode, and a liquid crystal interposed between the upper and lower substrates. A detailed explanation about the lower substrate (i.e., array substrate) of the IPS-LCD device will be provided referring to figures.

FIG. 2 is a schematic plan view illustrating one pixel of an array substrate of an in-plane switching mode liquid crystal display (IPS-LCD) device according to a related art. As shown, gate lines 32 and a common line 36 are arranged parallel to each other, and data lines 44 are arranged perpendicular to the gate and common lines 32 and 36. A pair of gate and a pair of data lines 32 and 44 define a pixel region P. A thin film transistor (TFT) 41 that is connected to the gate and data lines 32 and 44 is disposed at a crossing portion of the gate and data lines 32 and 44. The common line 36 transversely crosses the pixel region, and a plurality of common electrodes 38 are disposed perpendicular to the common line 36 and connected thereto at a center of the pixel region. The plurality of common electrodes 38 are spaced apart from each other with a predetermined interval therebetween.

A plurality of pixel electrodes 50 are disposed parallel to the data line 44 and connected to a pixel connecting line 51, which is disposed above the gate line 32. Since the pixel connecting line 51 overlaps a portion of the gate line 32, the pixel connecting line 51 and the portion of the gate line 32 constitute a storage capacitor S. Namely, the pixel connecting line 51 acts as a first electrode of the storage capacitor S, while the portion of the gate line 32 acts as a second electrode of the storage capacitor S.

Furthermore, one of the pixel electrodes 50 is electrically connected with the TFT 41. The plurality of common electrodes 38 and the pixel electrodes 50 are spaced apart from each other with a predetermined interval therebetween and arranged in an alternating pattern. Therefore, each common electrode 38 is parallel to an adjacent pixel electrode 50.

The TFT 41 includes a gate electrode 34, an active layer 40, a source electrode 46 and a drain electrode 48. The gate electrode 34 is a portion of the gate line 32; the source electrode 46 extends from the data line 44 over the gate electrode 34; the drain electrode 48 extends from one of the pixel electrodes 50 over the gate electrode 34; and the active layer 40 is disposed over the gate electrode 34 between the source electrode 46 and the drain electrode 48.

By the above-described structure and with additional parts such as polarizers and alignment layers, the IPS-LCD device displays images. The IPS-LCD device has wide viewing angles since the pixel and common electrodes are both placed on the lower substrate, as shown in FIG. 2. Namely, the in-plane horizontal electric field generated by the common and pixel electrodes makes it possible to provide the wide viewing angles.

In the IPS-LCD device, the pixel electrodes and/or the common electrodes are generally formed of a transparent conductive material, such as indium tin oxide or indium zinc oxide, in order to increase an aperture ratio of the IPS-LCD device. Meanwhile, the array substrate having large size is divided into a plurality of cells each of that includes a large number of pixels shown in FIG. 2.

FIG. 3 is a schematic plan view of a large-sized glass substrate where a plurality of cells are defined. As shown, a large-sized glass substrate 60 has a plurality of cells 62 which are defined thereon. The cells 62 have the same layer pattern and the same layer element is formed at the same time. The layer patterns in the cells 62 are formed through a photolithography process. As widely known, the photolithography process includes forming a photo-resist on an object thin film, applying light (e.g., ultraviolet light) to the photo-resist, developing the irradiated or non-irradiated photo-resist, and etching exposed portions of the thin film. Applying light to the photo-resist uses a mask where various kinds of patterns are drawn. These processes are performed sequentially and applied to the large-sized glass substrate 60 having the cells 62 at the same time. Among the processes of the photolithography process, the light-exposure of the photo-resist is most important because it determines the layer pattern shape. The substrate having the photo-resist is first mounted on a chuck of a light exposure apparatus and then the light (e.g., ultraviolet light) is applied to the photo-resist through the mask.

FIG. 4 is a plan view illustrating a chuck for use in a light exposure apparatus according to a related art; and FIG. 5 is a cross-sectional view taken along line V—V of FIG. 4 for illustrating a light exposure process.

In FIGS. 4 and 5, a light exposure apparatus includes a chuck 70 on which a substrate 60 is mounted, a light source 80 that emits light to the substrate 60, and a mask 90 that is disposed between the substrate 60 and the light source 80. The chuck 70 generally includes lift pins 72 and lift pin holes 74. Each lift pin 72 moves up-and-down direction to lift up and down the substrate 60 along the lift pin hole 74. The substrate 60 includes a thin film 63 and a photo-resist 64 thereon and is fixed onto the chuck 70.

As shown in FIG. 4, the chuck 70 has a rectangular shape corresponding to the substrate 60. The lift pin holes 74 are diagonally disposed in position corresponding to the cells 62 of the substrate 60. Two lift pin holes 74 diagonally face to each other. Each lift pin 72 is located in each lift pin hole 74. In other words, when the substrate 60 having the cells 62 is mounted on the chuck 70, each cell 62 is positioned above each lift pin hole 74 having the lift pin 72.

Referring to FIG. 5, the light exposure process is performed by emitting the light through the mask 90. The light source 80 emits the light and irradiates the photo-resist 64 through the mask 90. Since the mask 90 has patterns, and the light passes through the mask, the photo-resist 64 is exposed to have the same pattern as the mask 90. At this time, because the mask 90 is much smaller than the substrate 60, the mask 90 sequentially moves up-and-down to expose all of the substrate 60 having the photo-resist 64.

However, when forming the pixel and/or common electrodes of the transparent conductive material using the above-mentioned chuck 70, the light passes through the transparent conductive material and the substrate and then is reflected by the lift pin hole 74. Therefore, the photo-resist 64 is affected by the reflected light and abnormally exposed. The light reflected by the lift pin hole 74 has characteristics different from the light reflected by the surface of the chuck 70, thereby causing abnormal patterns having the shape similar to the lift pin hole 74. These abnormal patterns produce serious problems in the array substrate for use in the IPS-LCD device.

SUMMARY OF THE INVENTION

Accordingly, the present invention is directed to a chuck for an exposure apparatus that substantially obviates one or more of the problems due to limitations and disadvantages of the related art.

An advantage of the present invention is to provide a chuck for use in an exposure apparatus that has modified lift pin holes to prevent abnormal patterns during a light exposure process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an embodiment of the present invention provides a chuck on which a substrate having a plurality of cells is disposed for a light exposure process. The chuck includes a chuck frame having a rectangular shape corresponding to the substrate; first and second lift pin holes that face to each other with respect to a horizontal center line of the chuck frame; third and fourth lift pin holes that face to each other with respect to a vertical center line of the chuck frame; and lift pins in each lift pin hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this specification, illustrate embodiments of the invention, and, together with the description serve to explain the principles of the invention where possible in the figures like reference numerals denote like parts.

In the drawings.

DETAILED DESCRIPTION OF THE ILLUSTRATED EMBODIMENTS

Reference will now be made in detail to an illustrated embodiment of the present invention, an example of which is shown in the accompanying drawings. Wherever possible, similar reference numbers will be used throughout the drawings to refer to the same or similar parts.

Figure 6:
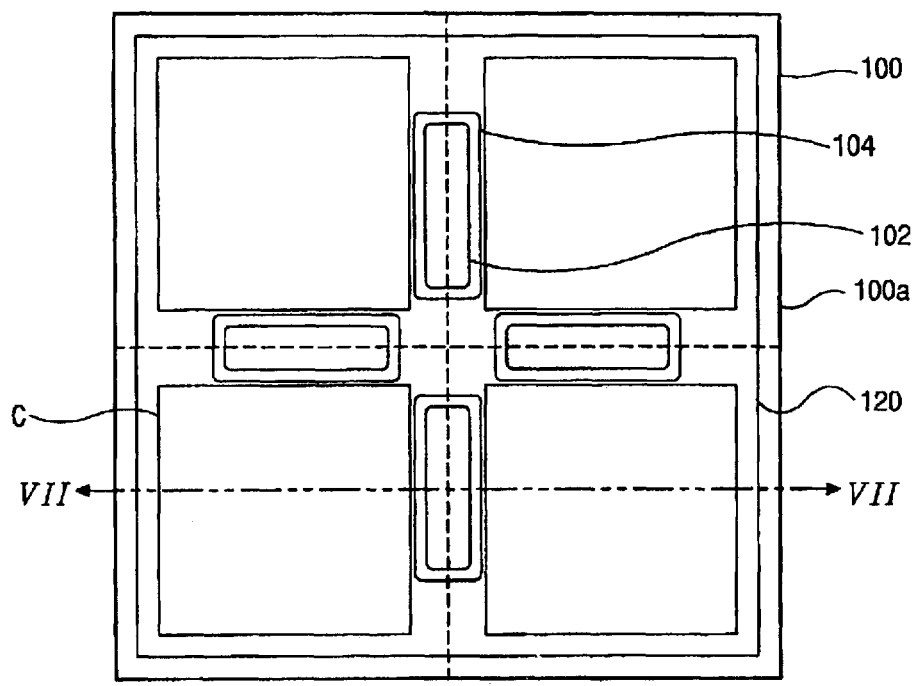
FIG. 6 is a plan view illustrating a chuck for use in a light exposure apparatus according to the present invention.
Figure 7:
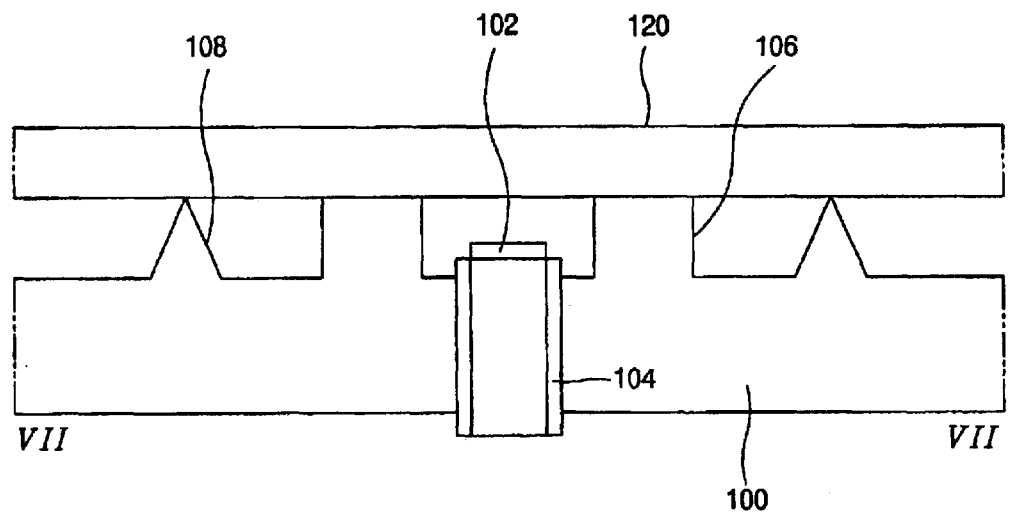
FIG. 7 is a cross-sectional view taken along line VII—VII of FIG. 6 and illustrates an inventive structure of the chuck.

FIG. 6 is a plan view illustrating a chuck for use in a light exposure apparatus according to the present invention, and FIG. 7 is a cross-sectional view taken along line VII—VII of FIG. 6 for illustrating an inventive structure of the chuck.

As shown in FIGS. 6 and 7, a chuck 100 for a light exposure apparatus includes lift pins 102 that lift up and down a substrate 120, lift pin hole 104 through which the lift pins 102 move, and vacuum adsorbers 106 that hold the substrate 120 using a vacuum inhalation. Furthermore, the chuck 100 includes triangular protrusions 108 that support the substrate 120. Because of the triangular shape of the protrusions 108, a contact surface of the substrate 120 is reduced. At this point, the vacuum adsorbers 106 and the triangular protrusions 108 have the same height to tightly fix the substrate 120 to the chuck 100. The chuck may include a chuck frame 100a to support the protrusions 108 and the vacuum adsorbers 106. The chuck frame 100a has a shape corresponding to a shape of the substrate 120.

Figure 1:
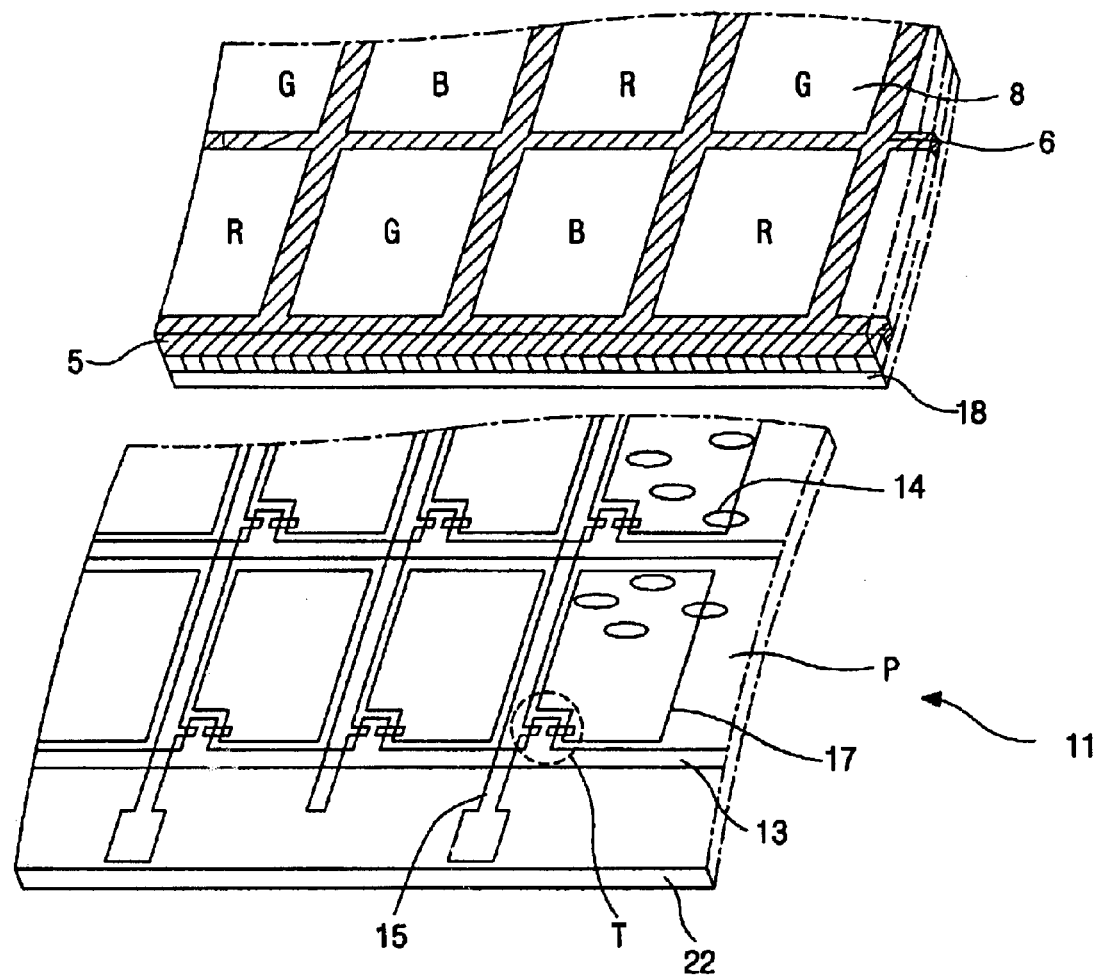
FIG. 1 shows a schematic exploded perspective view illustrating an LCD device according to a related art.
Figure 2:
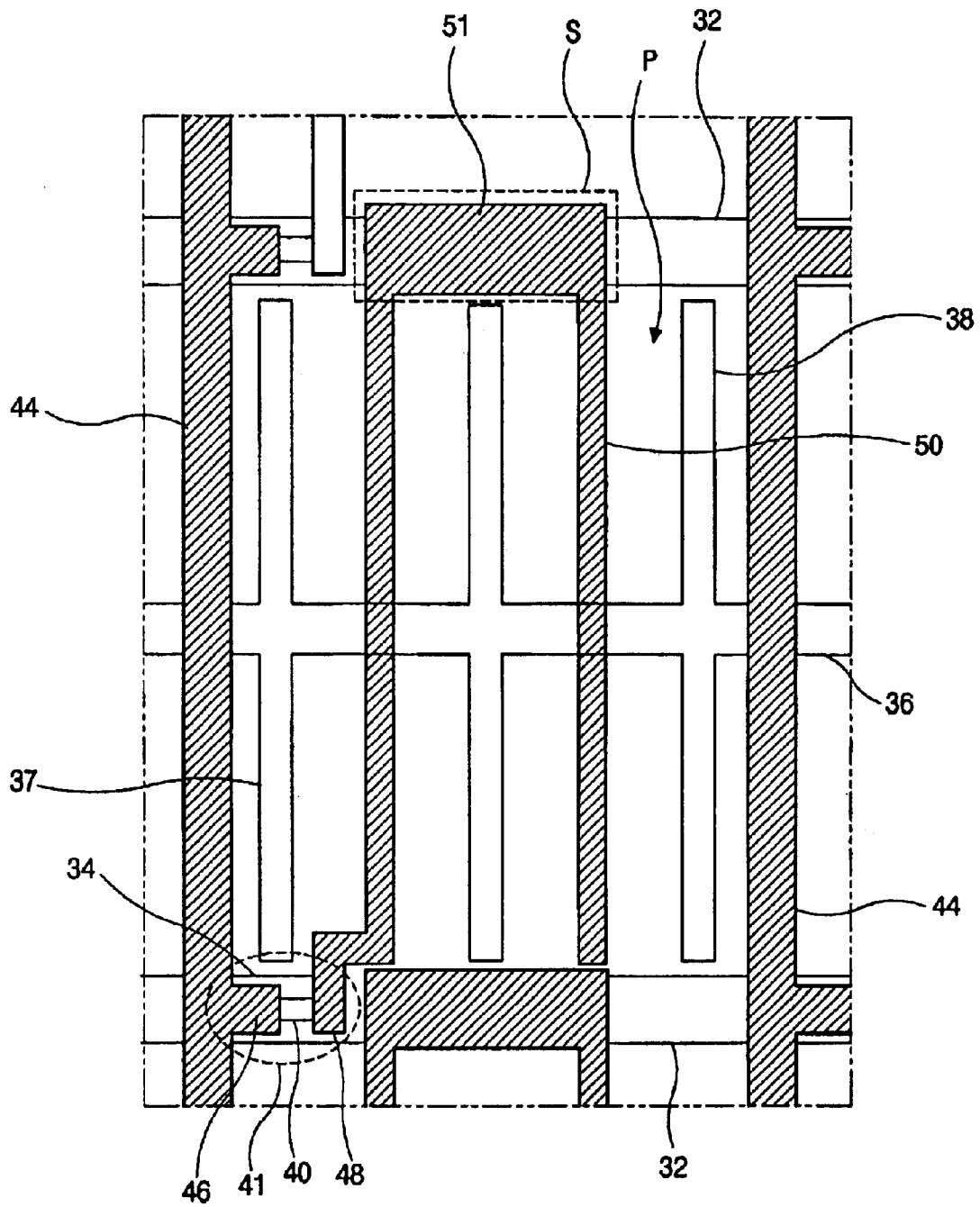
FIG. 2 is a schematic plan view illustrating one pixel of an array substrate of an in-plane switching mode liquid crystal display (IPS-LCD) device according to a related art.
Figure 3:
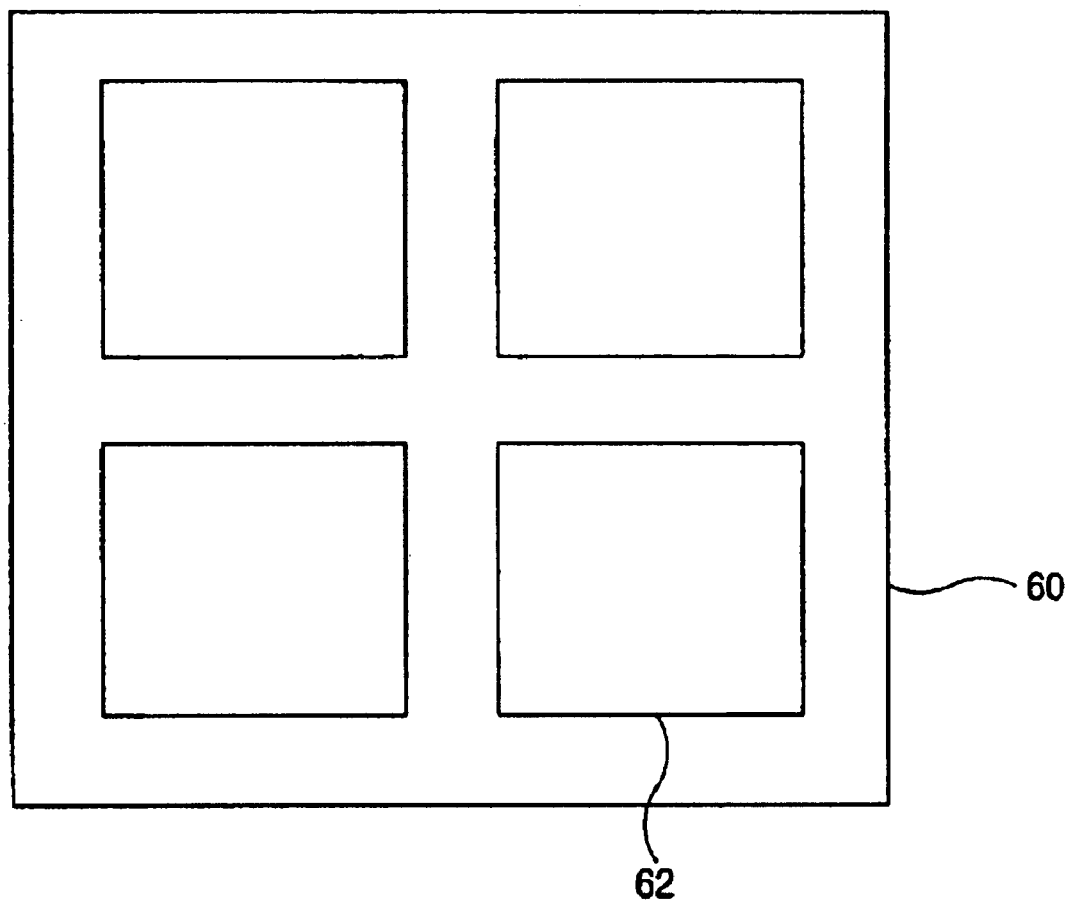
FIG. 3 is a schematic plan view of a large-sized glass substrate where a plurality of cells are defined.
Figure 4:
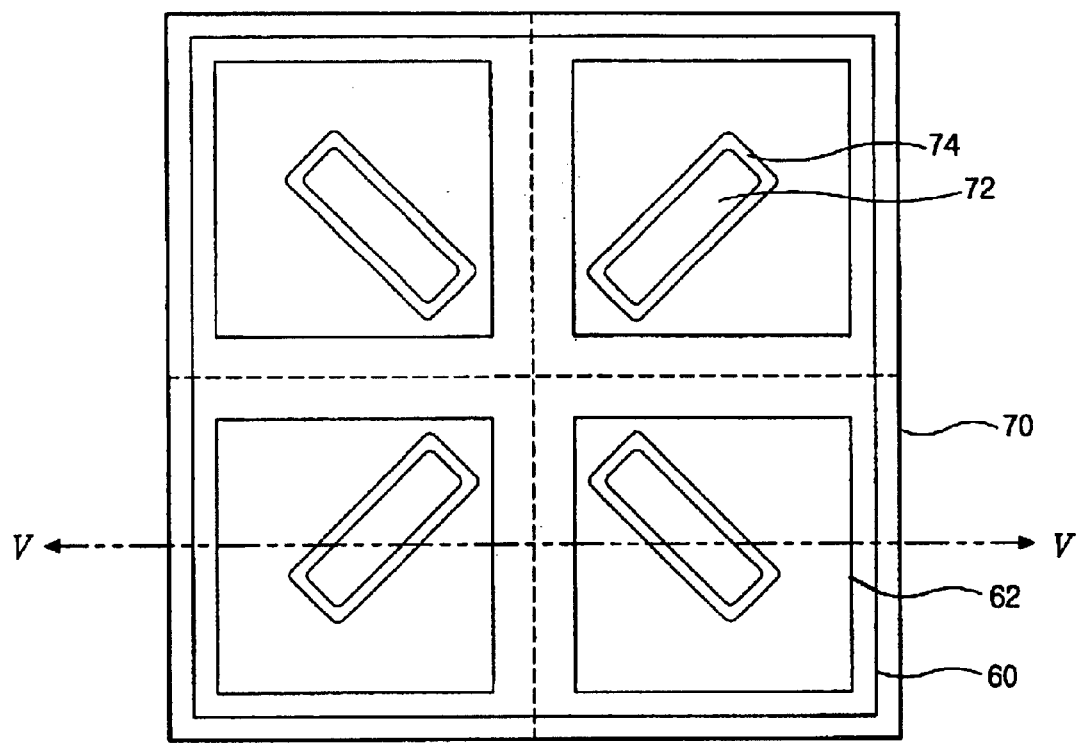
FIG. 4 is a plan view illustrating a chuck for use in a light exposure apparatus according to a related art.
Figure 5:
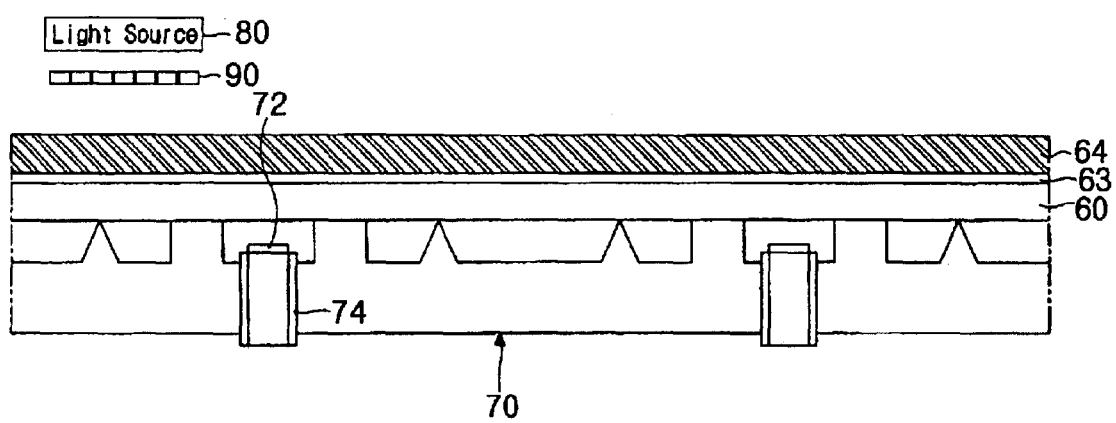
FIG. 5 is a cross-sectional view taken along line V—V of FIG. 4 and illustrates a light exposure process.

In the present invention, the lift pin holes 104 having the lift pins 102 are disposed among cells C of the substrate 120. Specifically, each lift pin hole 104 is disposed between the cells C, unlike the related art shown in FIG. 4. Two lift pin holes 104 are disposed and face to each other with respect to a horizontal center line of the substrate 120. Furthermore, the other two lift pin holes 104 are disposed and face to each other with respect to a vertical center line of the substrate 120. Therefore, each lift pin hole 104 having the lift pin 102 does not correspond to each cell C of the substrate 120, as compared to the related art shown in FIG. 4.

Accordingly in the present invention, although light emitted from the light source during the light exposure process is reflected by the lift pin hole 104, the light does not affect a photo-resist formed on the substrate 120. Namely, when forming the pixel and/or common electrodes of the transparent conductive material, abnormal patterns are not formed on the array substrate, thereby increasing the yield of production.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A chuck on which a substrate for a liquid crystal display device having a plurality of cells is disposed for a light exposure process, comprising:

a chuck frame having a rectangular shape corresponding to the substrate;

first and second lift pin holes on a horizontal center line of the chuck frame;

third and fourth lift pin holes on a vertical center line of the chuck frame; and lift pins in each lift pin hole.

2. The chuck according to claim 1, wherein each lift pin hole having the lift pin is located in a region corresponding to a region on the substrate between the cells of the substrate.

3. The chuck according to claim 1, further comprising vacuum adsorbers on an upper surface of the chuck frame.

4. The chuck according to claim 3, further comprising triangular protrusions supporting the substrate.

5. The chuck according to claim 4, wherein the vacuum adsorbers and the triangular protrusions have a same height.

6. The chuck according to claim 5, wherein the vacuum adsorbers and the triangular protrusions fix the substrate to the chuck.

7. The chuck according to claim 3, wherein the vacuum adsorber holds the substrate using a vacuum inhalation.

8. The chuck according to claim 1, wherein the lift pins lift up and down the substrate.

9. A chuck for processing a substrate for a liquid crystal display device having a plurality of cells comprising:

a chuck frame having a shape corresponding to a shape of the substrate;

a plurality of lift pins aligning with regions between the cells; and a vacuum adsorber on an upper surface of the chuck frame.

10. The chuck according to claim 9, further comprising at least one protrusion corresponding to one of the cells.

11. The chuck according to claim 10, wherein the at least one protrusion has a triangular cross section.

12. The chuck according to claim 9, wherein the vacuum adsorber holds the substrate using a vacuum inhalation.

* * * * *